United States Patent [19]

Sulzle

[11] Patent Number: 4,517,737
[45] Date of Patent: May 21, 1985

[54] APPARATUS FOR SECURING CONNECTORS TO A FABRIC

[75] Inventor: Walther Sulzle, Rosenfeld, Fed. Rep. of Germany

[73] Assignee: Wilhelm Sulzle, Rosenfeld, Fed. Rep. of Germany

[21] Appl. No.: 496,415

[22] Filed: May 20, 1983

[30] Foreign Application Priority Data

May 26, 1982 [DE] Fed. Rep. of Germany ....... 3219767

[51] Int. Cl.³ .................... B23P 19/00; B23P 11/00
[52] U.S. Cl. .................................. 29/798; 29/243.51
[58] Field of Search ........................... 227/139–155; 29/798, 243.51

[56] References Cited

U.S. PATENT DOCUMENTS

| 252,248 | 1/1882 | Pease | 81/394 |
| 2,167,820 | 8/1939 | Ziller | 29/243.51 |

FOREIGN PATENT DOCUMENTS

| 641233 | 1/1937 | Fed. Rep. of Germany | 29/243.51 |
| 816743 | 8/1937 | France | 29/243.51 |
| 617784 | 2/1949 | United Kingdom | 29/243.51 |
| 794829 | 5/1958 | United Kingdom | 29/243.51 |

Primary Examiner—Howard N. Goldberg
Assistant Examiner—Steven Nichols
Attorney, Agent, or Firm—Max Fogiel

[57] ABSTRACT

An apparatus for securing a connector to fabric is disclosed. The connectors are used connect the opposite ends of a fabric belt so as form an endless belt. The connectors are initially in the shape of a V, with legs of unequal lengths. Each leg has an inwardly projecting tip oriented at an accute angle to its respective leg. The connector is secured to the fabric by placing the fabric between the legs and bending them inwardly so that the tips penatrate into the flat woven fabric, thereby securing the connector to it. When the connector is secured to an end of the fabric belt, the apex of the V-shaped connector forms a rounded loop which may then be used to connect it to the opposite end of the fabric belt. The present invention has a pair of primary jaws which press against and actuate a pair of secondary jaws. The connector is secured between the secondary jaws which press against the connector and bend it into the fabric.

4 Claims, 3 Drawing Figures

APPARATUS FOR SECURING CONNECTORS TO A FABRIC

BACKGROUND OF THE INVENTION

This invention relates generally to eyelets or loops which are secured to a piece of cloth or fabric. Once secured to the cloth or fabric, such connectors are then used to secure the cloth to other objects or to itself. Such connectors are used in connecting the opposite ends of a woven fabric belt, so as to form an endless belt. Of course, two or more belts may be used to form a large endless belt. Such endless belts have many common uses, such as conveyor belts, or belts for transmitting power. The ends of such belts are connected together by placing the opposite ends adjacent one another so that a connecting pin may be inserted through their respective loops or eyelets. This type of a connection is quite flexible and strong.

In the past, such conveyor and transmission belts were made of leather. Today such belts or endless loops are made of flat woven fabrics which are manufactured from a variety of materials, which include rubber, polyvinyl chloride, metal, and other plastic fabrics.

The connectors, which are secured to the fabric, are generally made of steel wire or steel strips. Such connectors provide a highly reliable connecting mechanism which has the advantage of being easily engaged and disengaged. In order to secure the connectors to the fabric, the tips at the ends of the unequal legs of the V-shaped connector must be pressed and bent into the flat woven fabric. An adequate pressure is required for this purpose.

The pressure can be applied by striking the connector with a hammer or by using a device from an appropriate class of such devices. The belt connectors are generally held in position with a holding device which includes a pin around which the two legs are pressed, so as to form a round eye. The two pressing jaws which form a portion of the holding device are generally moved together in a linear fashion resembling a vice. They may be mechanically or hydraulically actuated.

When such connectors are used to form an endless belt, particularly for power transmission belts, it is desirable that such connectors product minimal noise and vibration when the connectors pass over rollers, shafts, and the like. In order to achieve this, the legs of the connector should be parallel and make a semicircular or U-shaped "eye" around the belt thickness. Experience has shown that the U-shape has optimal characteristics in terms of useful life and smoothness of operation. The U-shape is achieved when the pin which forms the eye is fifteen to twenty percent thinner than the thickness of the fabric to which the connectors are being secured.

If the diameter of the pin about which the legs are bent is too small, the legs of the connector will rest against the fabric and the tips will not penatrate completely into the material. This results in a slight, but measurable V-shape or bulge or the legs of the connector being retained. This is disadvantageous in that the connectors may open upon application of a load. Additionally, vibrations are produced when the connectors pass over rollers, shafts, and the like, as the orientation of the V is such that a step is formed where the tip enters the fabric.

If, on the other hand, the diameter of the pin is selected to be greater than the thickness of the fabric, the connector will be completely pressed into the fabric when the appropriate pressure is applied. Of course, the internal diameter of the eye or loop of the connector will be determined in accordance with the diameter of the pin about which the connector is being bent. This will result in the outer diameter of the loop being greater than the thickness of the fabric. This configuration also results in the inwardly projecting tips of the connector being excessively pressed in to the fabric so that the tensile load bearing ability of the connection will be substantially reduced, since the tips damage the material. During use, the connection may initially retain its structural integrity; however, as the belt is used, vibrations will occur which, depending upon the belt speed, will result in a tearing or bursting of the connection. This is especially true in the case of unilateral loading where distortion of the joint will occur.

It has recently become the practice to make flat woven fabric belts very thin. Such thin belts generally have a thickness within the range of 0.5 to 2 millimeters, particularly for conveyor belts. With the advent of such thin belts, a minimum diameter of the eye of the connector became necessary in order to absorb the load imposed on the connectors. This has resulted in the eye or loop of the connector necessarily having a diameter which is larger than the thickness of the fabric which it is being secured to.

In connecting the opposite ends of a woven fabric belt together, or in connecting two woven fabric belts to each other, two ends of fabric must each have a number of belt connectors connected in such a manner that the eyes of the two ends are staggered with respect to each other. The ends are place together so that they almost abut one another so that a connecting pin may be passed through all of the eyes. In this manner a very durable, flexible, and detachable connection mechanism is provided. The diameter of the loop is a function of the force which must be passed by the connection, the strength of the connection pin, and the number of eyes used. As previously indicated, the advent of high stength, thin, woven fabric materials has resulted in the requirement that the connecting rod be sized such that the exterior diameter of the connector loop must be equal to or greater than the thickness of the woven fabric material. This has created a bulge at the connector which creates vibrations when the endless belt which uses such connectors passes over rollers, drums, drive shafts, and the like.

It is desirable that the pins about which the connectors are bent be selected so that their diameter is somewhat less than the thickness of the flat woven fabric. When the connectors are bent about such pins, their legs will make contact with the sides of the fabric, resulting in the connector having a U-shape. This can only be achieved when the loop diameter is approximately equal to the fabric diameter.

SUMMARY OF THE INVENTION

The present invention bends fabric connectors, of the type previously described which have a loop or eye diameter larger than the thickness of the fabric, so that when used in fabric power transmission belts and the like a strong flexible connection means is provided which minimizes the tendency of such connection means to induce vibrations when in use. The present invention includes a secondary jaw assembly for restraining the open, initially V-shaped connector which is positioned between a pair of primary jaws.

The secondary jaw assembly includes a pair of secondary jaws which are mounted on a pair of pivotally mounted arms. Each of the arms have a slot therein, which is oriented to be transverse to the surface of its respective secondary jaw, each of which is mounted on a pivot pin. The pivot pin is mounted on a support member. Also connected to the support member is a form pin. The V-shaped connector, which may be rounded at its apex, is positioned so that it partially wraps around the form pin and each of its legs abut one of the secondary jaws. Each of the primary jaws have a first surface on the upper portion of their operative face, and an angled second surface on the lower portion of their operative face.

When the primary jaws are drawn together, they force the secondary jaws to bend the connector about the mold pin. The surfaces on the primary jaws are designed such that the secondary jaws always remain in parallel contact with the legs of the connector; this is permitted, in part, by the slippage which is permitted between the arm and pivot pin, due to the slot formed therein. The two surfaces on each of the primary jaws are designed such that the arms supporting the secondary jaws are flush with the first surface on the primary jaws when the legs of the connector are parallel with the fabric. As the primary jaws continue to be forced together, the arms tip onto the second surface of the primary jaws.

The secondary jaw assembly thus insures that the secondary jaws abut the two arms of the connectors along their full length, and also guide them during bending. This results from the fact that the secondary jaw surfaces are able to pivoted about the form pin. The invention can effectively secure a connector where the form pin, and thus the internal diameter of the eye formed by the bending of the connector, has been selected such that its diameter is larger than the thickness of the fabric. This provides assurance that the connecting pin can be appropriately sized to withstand the large force.

As previously mentioned, if the legs of the connector are bent so that they are parallel to the fabric, the secondary jaws can rotate or tip about the apex of the two surfaces on the primary jaws as a result of the slots in the arms which support the secondary jaws. This is done in a manner which insures that the necessary pressure is fully transferred to the inwardly projecting tips located at the end of the legs of the connectors. The tips then penatrate through the fabric and are bent in the direction of the loop, which results in the connector being secured to the fabric with high degree of holding strength. This is accomplished so that the legs of the connector are straight after they have been secured to the fabric. This is achieved without structural damage to the fabric.

Additionally, the connector is further bent inwardly, beyond the U-shape, thus firmly pressing the inwardly projecting tips firmly into the fabric.

The bending of the connector beyond the shape of a U causes the ends of the connector to be essentially flush with the surface of the fabric. When such connectors are secured to one another by a connecting pin, as is the case when such connectors are used with power transmission belts and the like, smooth operation is achieved. As the belt advances over, say, a roller, the roller gradually passes from the fabric to the connector onto the opposing connector, and finally to the fabric. As a result, the flat woven fabric is raised continuously from the surface of the roller until the maximum diameter is reached, and then continuously lowered over the adjacent connector, down to the surface of the other piece of flat woven fabric, without jumps, bumps, or vibrations. In the case of soft flat woven fabrics, the tips of the legs of the connector are pushed in all the way, and in the case of harder flat woven fabrics, only partially.

Accordingly, it is an object of the present invention to provide an apparatus which can secure an open V-shaped connector to a piece of fabric by being it.

It is another object of the present invention to provide an apparatus as set forth in the preceding object, which can secure the connector to the fabric in such a manner so as to eliminate vibrations when the connectors are used in an endless belt constructed of a woven fabric.

BRIEF DESCRIPTION OF THE DRAWINGS

The construction of the preferred embodiment, as well as futher objects and advantages of the present invention will become further apparent from the following specification when considered with the accompanying drawings in which like numerals refer to like parts wherein.

DESCRIPTION OF THE PREFERRED EMBODIMENT

Figure 1:
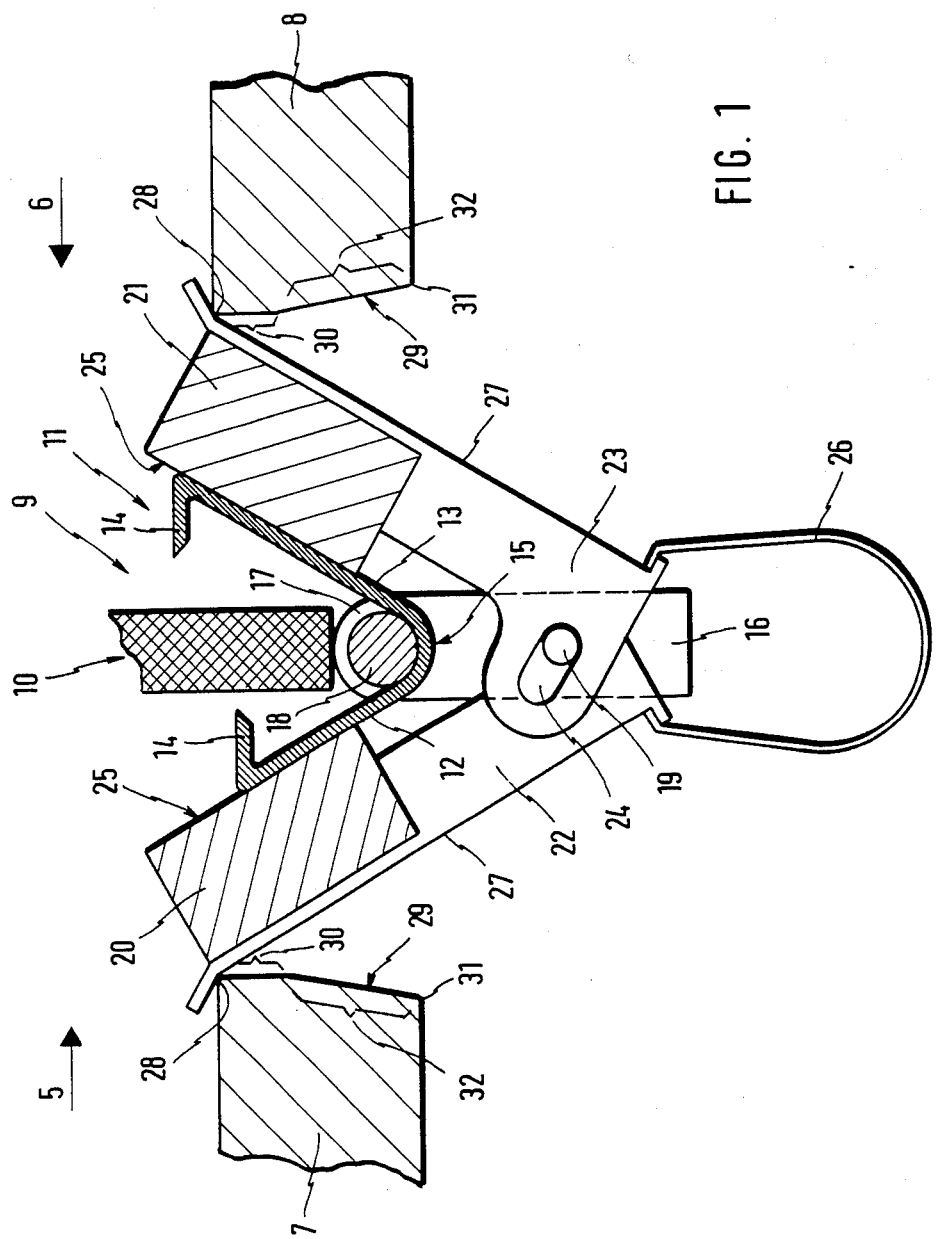
FIG. 1 is a side schematic view of the present invention with the jaws open.

Reference will now be made to FIG. 1 wherein a pair of movable jaws 7 and 8 are shown. A secondary jaw assembly 9 is shown positioned between the jaws 7 and 8. An enlarged, for purposes of clarity, edge view of a flat piece of woven fabric 10 is shown into which a row of connectors are to be secured. Of course, in the schematic side views shown in the drawings, only a single connector 11 may be seen.

The connector 11 which is shown in an open V-shaped position in FIG. 1 has legs 12 and 13 connected to one another by a round eye or loop portion 15. The legs 12 and 13 are of unequal length and each have inwardly projecting tips 14 integrally connected thereto. The tips 14 form an accute angle with their respective legs.

As previously indicated, the figures show a single connector. In the preferred embodiment of the invention, a number of connectors may be secured to the fabric 10 at one time. A comb-like holding member 16 is provided for this purpose. The holding member 16 has a number of transverse slots into which the connectors 11 are inserted. The holding member 16 may be manufactured from sheet metal which is curved into a U-shape and into which the appropriate slots have been formed. A pin 18 is introduced through the eyes or loops 15 of the connectors prior to their being bent. The legs 12 and 13 of the connectors 11 are bent around pin 18.

The secondary jaw assembly 9 is provided with a rod 19 about which rotation may occur. Jaw assembly 9 includes secondary jaws 20 and 21 which are respectively mounted on arms 22 and 23. Additionally, each arm 22 and 23 has formed therein an elongated hole o slot 24 which extends perpendicular to rod 19.

Secondary jaws 20 and 21 are each provided with a flat pressing surface 25 which makes contact with the legs of the connectors 11. Additionally, the arms 22 and 23 of jaw assembly 9 are held in the open position by means of a spring 26. The upper ends of legs 12 and 13 are bent outwardly so that the jaw assembley 9 may be placed loosely between primary jaws 7 and 8. The outer surface 27 of arms 22 and 23 contact an upper edge 28 of primary jaws 7 and 8.

Each of the primary jaws 7 and 8 have two surface regions. From the upper edge 28 a flat partial region or surface 30 forms a portion of the front surface 29 of each of the jaws 7 and 8. Surfaces 30 on each of the primary jaws 7 and 8 are formed so that they are parallel to one another. Each of the primary jaws 7 and 8 has a plane bevel recess 32 formed on its face 29 below region 30. The area or apex between region 30 and recess 32 about which tipping or tilting occurs is curved in a constant or variable manner, as appropriate for the particular design.

Figure 2:
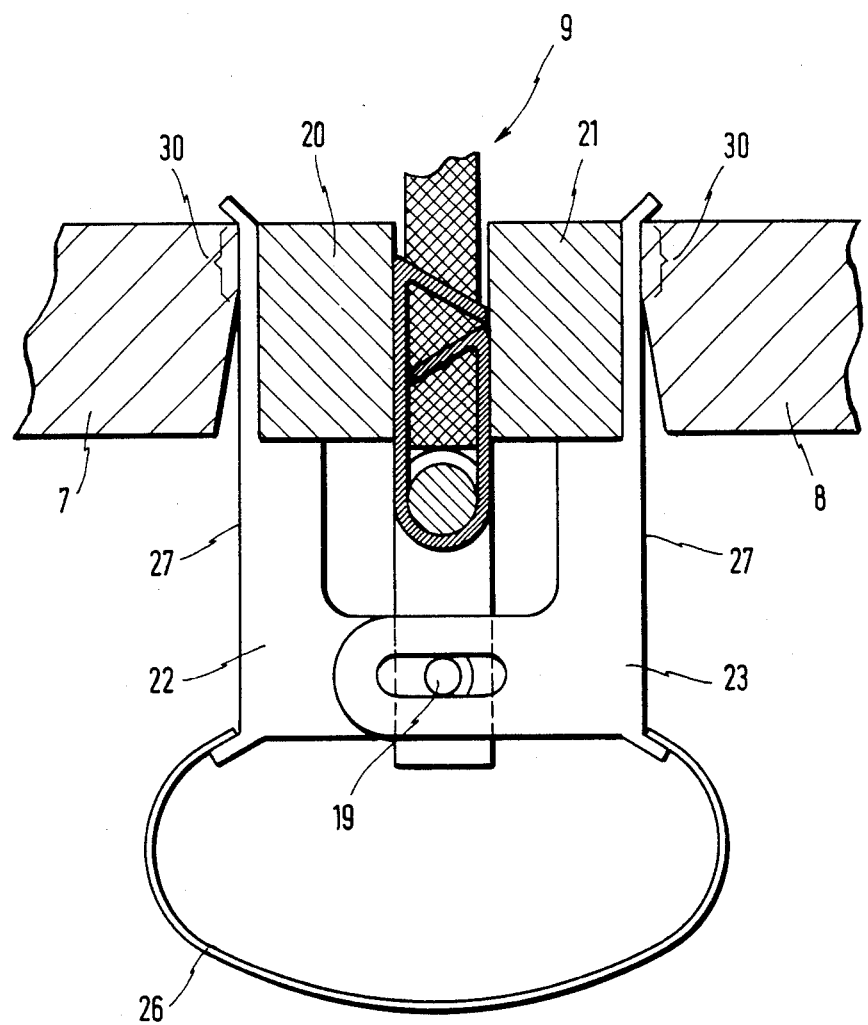
FIG. 2 is the invention shown in FIG. 1 with the jaws at an intermediate position.
Figure 3:
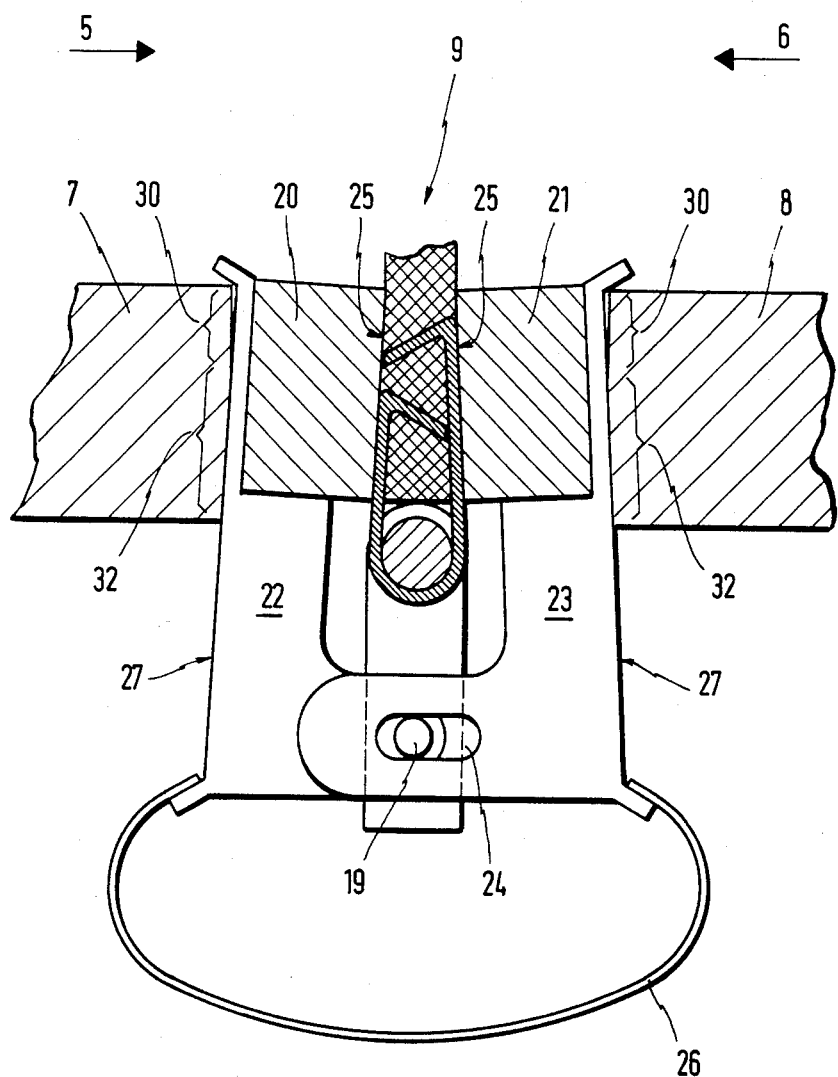
FIG. 3 is the invention shown in FIG. 1 with the jaws in a fully closed position.

FIGS. 2 and 3 show the invention described in FIG. 1, but in different operation positions.

In FIG. 1, the secondary jaw assembly 9, having secondary jaws 20 and 21, is held open in a V-shaped position due to the force exerted by spring 26. Spring 26 acts on arms 22 and 23. The angle between arms 22 and 23 is the same as the angle between legs 12 and 13 of connector 11. Legs 12 and 13 are pressed together when primary jaws 7 and 8 are moved together in the direction indicated by arrows 5 and 6. As primary jaws 7 and 8 draw together, arms 22 and 23 are caused to pivot towards one another which, of course, cause secondary jaws 20 and 21 to bend connector 11. As the primary jaws 7 and 8 come together, arms 22 and 23 pivot about pin 19 until the configuration shown in FIG. 2 is reached, in which legs 12 and 13 and arms 22 and 23 are parallel to one another. As primary jaws 7 and 8 are drawn together, the outer face 27 of arms 22 and 23 have rotated about edge 28 of primary jaws 7 and 8 until, as shown in FIG. 2, surfaces 27 are flush and parallel with flat region 30 of primary jaws 7 and 8.

If a force is continued to be applied by bringing primary jaws 7 and 8 further together, the configuration shown in FIG. 3 results. As they are drawn together, arms 22 and 23 tip or flip over the point or apex between regions 30 and 32 on the primary jaws 7 and 8. This is permitted due to the elongated hole or slot 24 which is formed in each of the arms 22 and 23. As a result, the rear face 27 of each arm withdraws from flat region 30 and comes into abutment with bevel recess 32 of primary jaws 7 and 8. This, of course, forces the secondary jaws 20 and 21 to further press in and bend the legs 12 and 13 of connector 11. This forces the ends of the connector closer together, thus exerting a force on the inwardly projecting tips of the connector. The connector 11 ceases to have a U-shape, but rather a slightly conical form. In the preferred embodiment of the invention the flat region 30 preferably occupies no more than half of front face 29 of each primary jaw 7 and 8.

Thus, connector 11 is secured to fabric 10. The eye of the connector may have a diameter which exceeds the thickness of cloth 10. The legs of the connector are straight and the tips thereof are securely embedded in and secured to the fabric. In this manner, a smooth incline plane is formed between the surface of the fabric and the maximum thickness of the connector at its loop portion. This permits a gradual and even passage of an endless belt, which uses such belt connectors, when it is caused to pass over rollers, drive shafts, and the like, particularly at high speeds. This substantially reduces the vibration induced in such endless belts, thereby decreasing the forces dynamically acting on the connector belt interface. This substantially increases the loads which the belt can withstand, and additionally increases the service life of the belt.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. An apparatus for securing a V-shaped connector, having legs of unequal length and inwardly projecting tips, to a flat woven fabric which comprises: a pair of primary jaws; a secondary jaw assembly having a pair of arms pivotally connected by a pivot pin which passes through an elongated slot in each of said arms, said slots permitting said arms to be spaced apart when they are parallel to each other; and a pair of secondary jaws connected to said arms and adapted to press against the legs of said connector; each of said primary jaws having an inner face, said inner face having an upper flat region, said upper flat region being parallel to each other; and wherein said inner face has a lower region inclined outwardly; whereby said upper and lower regions cooperate with said arms to cause to draw together in a predetermined manner when said primary jaws are closed.

2. The apparatus of claim 1 which further includes an eye pin operably connected to said secondary jaw assembly for engaging the connector and acting as the pivot region about which the connector is bent.

3. The apparatus of claim 2 wherein said arms of said secondary jaw assembly have connected thereto at the ends thereof having the slot therein a spring which exerts a force which tends to maintain said secondary jaws in an open position.

4. An apparatus for securing a V-shaped connector, having legs of unequal length and inwardly projecting tips, to a flat woven fabric which comprises: a pair of primary jaws; a secondary jaw assembly having a pair of arms pivotally connected by a pivot pin which passes through an elongated slot in each of said arms, said slots permitting said arms to be spaced apart when they are parallel to each other; and a pair of secondary jaws connected to said arms and adapted to press against the legs of said connector, said secondary jaws pressing against said legs of said connector to a parallel position of said legs; and means on said primary jaws for pressing said secondary jaws against said legs further from said parallel position to an end position in which the legs are angularly positioned relative to each other, said legs having tips penetrating said fabric fully in said end position.

* * * * *